June 26, 1956 B. B. BAUER 2,752,428

PHONOGRAPH TRANSLATING DEVICE

Filed May 3, 1951

INVENTOR.

Benjamin B. Bauer

BY.

Thiess, Olson & Mecklenburger.

Att'ys.

United States Patent Office
2,752,428
Patented June 26, 1956

2,752,428

PHONOGRAPH TRANSLATING DEVICE

Benjamin B. Bauer, Oak Park, Ill., assignor to Shure Brothers, Incorporated, Chicago, Ill., a corporation of Illinois Application May 3, 1951, Serial No. 224,339

10 Claims. (Cl. 179—100.41)

This invention relates to devices termed phonograph pickups for reproducing sound from phonograph records, including a responsive or transducing unit and a needle or stylus for driving it, more particularly to apparatus for attaching the needle or stylus to the transducing unit, and it is an object of the invention to provide improved apparatus of this character.

Phonograph pickups frequently are in the form of cartridges which are attachable to a phonograph tone arm. Well known forms of such phonograph pickups or cartridges include a piezoelectric element which is adapted to be stressed for producing an electrical output and a phonograph needle associated with the pickup cartridge for engaging the grooves of a phonograph record. Transmitting structure is attached to the piezoelectric element and adapted to have the phonograph needle attached to it. By virtue of the transmitting structure, the mechanical movements of the phonograph needle, in following a record groove, are transmitted to the piezoelectric element which is deformed and consequently produces an electrical output.

In well known forms of cartridges such as described, the transmitting apparatus comprises a needle chuck arranged for torsional vibrations which is mounted on rubber or similar bearings held within the cartridge casing. Such rubber or similar material bearings tend to grip the transmitting apparatus and thus cause some loss through friction. Consequently, the output of the piezoelectric element is diminished. In pickups where the piezoelectric element comprises Rochelle salts, for example, the electrical output may be high enough so that sufficient useful output remains despite the losses occurring in the bearings.

There have become available, however, piezoelectric elements which are made of certain ceramic materials. The electrical output of such ceramic piezoelectric elements for the same applied force as compared with Rochelle salt piezoelectric elements, for example, is small. Hence, when using ceramic piezoelectric elements in phonograph pickup cartridges, it is highly desirable to reduce or eliminate mechanical losses as much as possible. Accordingly, it is a further object of the invention to provide an improved piezoelectric phonograph pickup of the character indicated wherein bearings for the transmitting apparatus between the phonograph stylus and the piezoelectric element have been eliminated.

It is a further object of the invention to provide improved apparatus of the character indicated wherein frictional losses between the piezoelectric element and the phonograph stylus have been substantially eliminated.

It is a further object of the invention to provide a phonograph pickup including an improved pickup element.

It is a further object of the invention to provide an improved transmitting apparatus or chuck for attaching the phonograph stylus or needle to the piezoelectric element.

It is a further object of the invention to provide an improved chuck for attaching the phonograph stylus or needle without the use of screws and the like.

It is a further object of the invention to provide an improved phonograph stylus or needle adapted for use in pickup cartridges of the character described.

In carrying out the invention in one form, a pickup element for a phonograph pickup is provided comprising, an elongated piezoelectric element adapted to be supported at one end in the pickup for transverse bending deformation and having its other end free, a needle chuck comprising a flattened tube having at one end a trapezoidal groove horizontally disposed within which the free end of the piezoelectric element is received for enabling the chuck to extend in line with the piezoelectric element without stress therein, the chuck being cemented substantially rigidly to the piezoelectric element at the trapezoidal groove for supporting the chuck without further support by the pickup, the flattened other end of the chuck including an opening therein, and a needle having a flat portion received within the flattened other end of the chuck and disposed substantially in line with the chuck and the piezoelectric element, the flat needle portion including two parts at a slight angle relative to each other with a protuberance at the apex of the angle whereby the protuberance is received in the opening for holding the needle to the chuck, the needle including a portion comprising substantially only a point offset from the flat portion thereof for engaging record grooves.

For a more complete understanding of the invention, reference should be had to the accompanying drawings in which.

Figure 1:
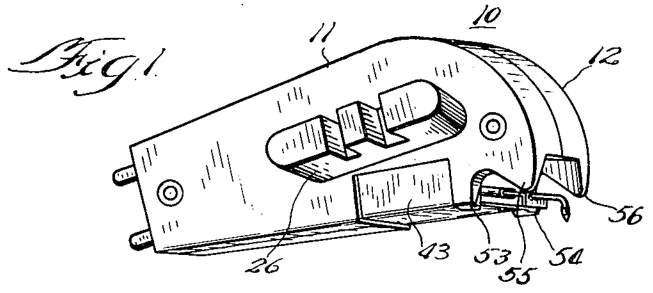
Figure 1 is a perspective view of a phonograph pickup cartridge embodying the invention.

The method of assembling the pickup of the subject application is disclosed and claimed in the application of Lee Gunter, Jr., Serial No. 224,410, entitled "Method of Assembling Phonograph Translating Device," filed May 3, 1951, now Patent No. 2,650,953, and assigned to the same assignee as the subject invention.

Referring to the drawings, the invention is shown embodied in a phonograph pickup cartridge 10 comprising a pair of casing halves 11 and 12 within which is mounted a pickup element 13 including a transducing element 14, for example, a piezoelectric element, a chuck or transmitting unit 15, and a phonograph needle or stylus 16.

The pickup element is supported within the casing at one end of the piezoelectric element 14 by means of rubber or similar material blocks 17 and 18 and the phonograph needle 16 extends outwardly of the casing at the forward end, the piezoelectric element 14, the chuck 15, and the needle 16 comprising a single element or unit mounted in cantilever fashion. Held within the rear of the cartridge are a pair of terminals 19 and 21 which are adapted to be received in suitable sockets on electrical leads in the phonograph pickup arm, and the other ends of the terminals are adapted to be electrically connected to appropriate sides of the piezoelectric elements by suitable conductors or straps 22 and 23. The weight of the tone arm and pickup cartridge which is permitted to rest upon the needle 16 when it engages the groove of a phonograph record is supported virtually entirely upon the piezoelectric element 14 during normal operation. A block of damping material 45 is disposed between the chuck 15 and an abutment on the casing but it is of such size and stiffness that it provides very little, if any, support for the pickup arm during normal operation. The presence of the block of damping material assists in preventing excessive deflections of the chuck when undue forces are exerted on the pickup arm.

The casing halves 11 and 12 may be formed of any material having good dimensional stability, such for example as Bakelite and plastic materials or metal, and are held together with the various parts assembled therein by means of rivets or the like 24 and 25. On the outside of each of the casing halves there may be a series of projections 26 and 27, respectively, which are utilized for holding the cartridge to the phonograph tone arm.

Each of the casing halves 11 and 12 is hollowed out to form a space for the active elements of the pickup. A series of serrations or grooves 28 and 29 are provided on the inside of the casing halves for gripping the rubber blocks 17 and 18. The piezoelectric element 14 must be firmly held between the blocks 17 and 18, but it is undesirable to compress the blocks 17 and 18 beyond a certain amount because the piezoelectric element may be held too tightly. These situations may exist when the dimensions of the various parts are such as to produce a very tight fit such as may arise when the manufacturing tolerances of the parts chosen at random are all in the same sense. Thus, for example, the rubber blocks 17 and 18 may, for a particular pickup, be thicker by the maximum amount of the permissible tolerance and the walls of the casing halves for this particular pickup may also be thicker by the amount of the permissible tolerance. Under these conditions, if the walls of the casing halves are smooth, that is, the serrations 28 and 29 are eliminated, the rubber blocks 17 and 18 are placed under a much greater compression than they are when the manufacturing tolerances tend in the other or minimum direction and consequently the piezoelectric element may be held too tightly. It has been found that by utilizing the serrations 28 and 29, the material of the blocks 17 and 18 flows into the serrations to a certain extent thereby properly holding the piezoelectric element.

Each of the rubber blocks 17 and 18 includes an open rectangular groove therein, which grooves lie opposite each other when the rubber blocks are placed together and thereby form a closed rectangular groove within which the rearward end of the piezoelectric element 14 is received. The piezoelectric element extends downwardly at an angle so that with the chuck 15 and the needle 16 substantially in line therewith, the end of the needle projects outwardly of the pickup and below thereof at the desired point.

The piezoelectric element 14 may be formed of any material having piezoelectric properties and the necessary strength, such as quartz, Rochelle salts or certain ceramic materials, for example. Any shape of piezoelectric element may be used, the elongated and rectangular cross-sectional element shown having been found satisfactory.

The chuck 15 includes a pair of prongs 31 and 32 which are arranged to lie on the two sides, respectively, of the forward end of the piezoelectric element, the chuck and the piezoelectric element being firmly held together by means of cement or the like. A layer of insulating and/or vibration isolating material, such as a thin sheet of rubber 30, may be cemented firmly to the forward end of the piezoelectric element and thus lie between the piezoelectric element and the prongs 31 and 32.

The chuck 15 may be formed by taking a tube of the desired material, for example steel or aluminum, of the desired length and flattening one end 33 of it until the two portions of the tube lie against each other and flattening the other end 34 so as to be within the same plane generally as the first part, but leaving a space or slot within which the end of the needle 16 may be received. The flat part 34 is provided with a hole 35 therethrough for purposes to be described. The prongs 31 and 32 are formed from part 33 and are larger at their bases than at their ends so as to form a generally trapezoidal groove 36 within which the end of piezoelectric element 14 is received.

When chuck 15 is cemented to piezoelectric element 14 as described, a relatively rigid structure is formed so that when the needle 16 is engaged within the chuck and the end of the needle is moved back and forth laterally by the record groove, the piezoelectric element 14 is placed under bending stresses. The piezoelectric element is fragile and cannot be stressed beyond a certain limit without being subject to breakage. Accordingly, the casing halves are provided with stops 37 and 38 against which the edges of the chuck 15 bear so as to limit deflections of the piezoelectric element. The stops 37 and 38 extend inwardly a sufficient distance so that contact therewith is made before the piezoelectric element is stressed beyond a desired limit.

It is essential that the chuck 15 be accurately disposed substantially equidistant from the stops 37 and 38 and remain so after the apparatus is assembled in order that the chuck can move laterally in each direction by the same amount. In this fashion sound is most faithfully reproduced. It has been found that during the manufacturing process the dimensions arising due to the permissible tolerances are such that the piezoelectric element may lie at a slight angle relative to the casing instead of being centrally disposed therein. Under this condition, if the chuck is attached to the piezoelectric element so as to lie directly in line therewith, it will be seen that the clearance between one of the stops 37 and 38 and the respective adjacent side of the chuck will be less than the other. Consequently, the chuck and the crystal may vibrate farther in one direction than in the other with resultant poor sound reproduction.

This may be obviated by first assembling the piezoelectric element, the rubber blocks 17 and 18 and the casing halves 11 and 12 together as a single unit. The insulating sheet 33 may also be cemented to the end of the piezoelectric element. The chuck 15 is then equidistantly disposed between stops 37 and 38 by means of shims placed therebetween and the respectively adjacent sides of the chuck. The free end of piezoelectric element 14 is received between the prongs 31 and 32 of the chuck, that is, in the trapezoidal slot 36. The prongs 31 and 32 and the free end of the piezoelectric element are so disposed relative to each other that the end of the piezoelectric element is not forced to move to either side of its position as determined by the rubber blocks 17 and 18 and the casing sides. The piezoelectric element and the chuck are then held relative to each other in an unstressed condition, the chuck 15 being in line with piezoelectric element 14. In this position of the piezoelectric element and the chuck 15, cement is applied to the adjacent surfaces of the end of the piezoelectric element and the studs 31 and 32. The cement is permitted to harden, and the shims are thereafter removed. The chuck then remains centered between the stops 37 and 38 and thus can vibrate laterally equal amounts.

To facilitate placing the shims and removal thereof and application of the cement, the sides of the casing halves are cut out to form openings defined by the edges 39, 41 and 42. These openings provide sufficient space for the operations referred to. After the assembly is complete, the openings may be closed by placing a substantially U-shaped cover 43 thereover. The cover may be made of any suitable material, for example metal.

Between the upper surface of chuck 15 and an abutment 44 internally of the casing halves, there is a piece of damping material 45 cemented preferably to the abutment and the chuck. The damping material may be of any well known material, for example rubber or Viscoloid, and improves the operation of the structure through absorbing or damping out undesired vibrations. As already pointed out, the damping material 45 provides some support for chuck 15 during excessive deflections thereof.

The stylus or needle 16 comprises a strap-like portion 46 for attaching the needle to the chuck, a record-engaging point 47, and a stem or shank portion 48 for attaching the point to the portion 46. The portion 46 includes a tab 49 bent downwardly and substantially at right angles to the general plane of the portion 46. A hole is provided in tab 49 of sufficient size to receive the stem 48 therethrough whereafter the stem 48 is welded or otherwise attached both to the tab 49 and to the underside of the portion 46. Accordingly, the stem 48 lies substantially in the plane of the portion 46. The other end of portion 46 is formed into a spring or resilient section defined by two angularly formed parts 51 and 52. The parts 51 and 52 are of a width and a thickness to be relatively easily received in the end slot of portion 34 of the chuck, as may be seen best in Fig. 4.

The apex of the angle formed by parts 51 and 52 is spaced away from the general plane of portion 46 so that when these parts are received in the slot of chuck 34, the apex bears against the inside wall of the chuck and causes the angle between the parts to tend to be straightened out. Consequently the portion 46 and hence the complete stylus 16 are firmly held within the chuck and in line therewith. At the junction of parts 51 and 52 there is a dimple or small protuberance 53 formed downwardly (Fig. 4) and when parts 51 and 52 are received within the slot in part 34 the resilience of parts 51 and 52 causes the dimple to be received in the lower portion of hole 35. Instead of a hole for receiving the dimple 53, a recess or similar means may be employed. Thus, a detent is formed for holding the complete stylus 16 firmly within the chuck. It will be understood, of course, that the parts 51 and 52 may be formed angularly upwardly with the dimple 53 extending upwardly instead of downwardly, as shown and the parts on which the dimple and recess are formed may be reversed. The effect of the displacement of the apex of the angle formed by parts 51 and 52 and resilience thereof may be obtained in other ways, for example, by forming the portion 46 arcuately. The protuberance 53 would be placed on the convex side thereof.

The stem 48 and the downwardly extending portion at the forward end thereof may be formed of suitable steel wire or other material having the desired elastic properties, and the point 47 may comprise a hardened steel member or a point of some other material, for example, a precious stone such as sapphire.

The parts 51 and 52 may be pushed into the slot in part 34 for attaching the needle to the device by pushing against the tab 49 with a fingernail in the direction of arrow A, and for removing the stylus one pushes against the tab 49 with a fingernail in the direction of arrow B. Consequently, the needle may be easily removed from and attached to the chuck and it is firmly held when attached without the use of screws.

Figures 2, 3, 4:
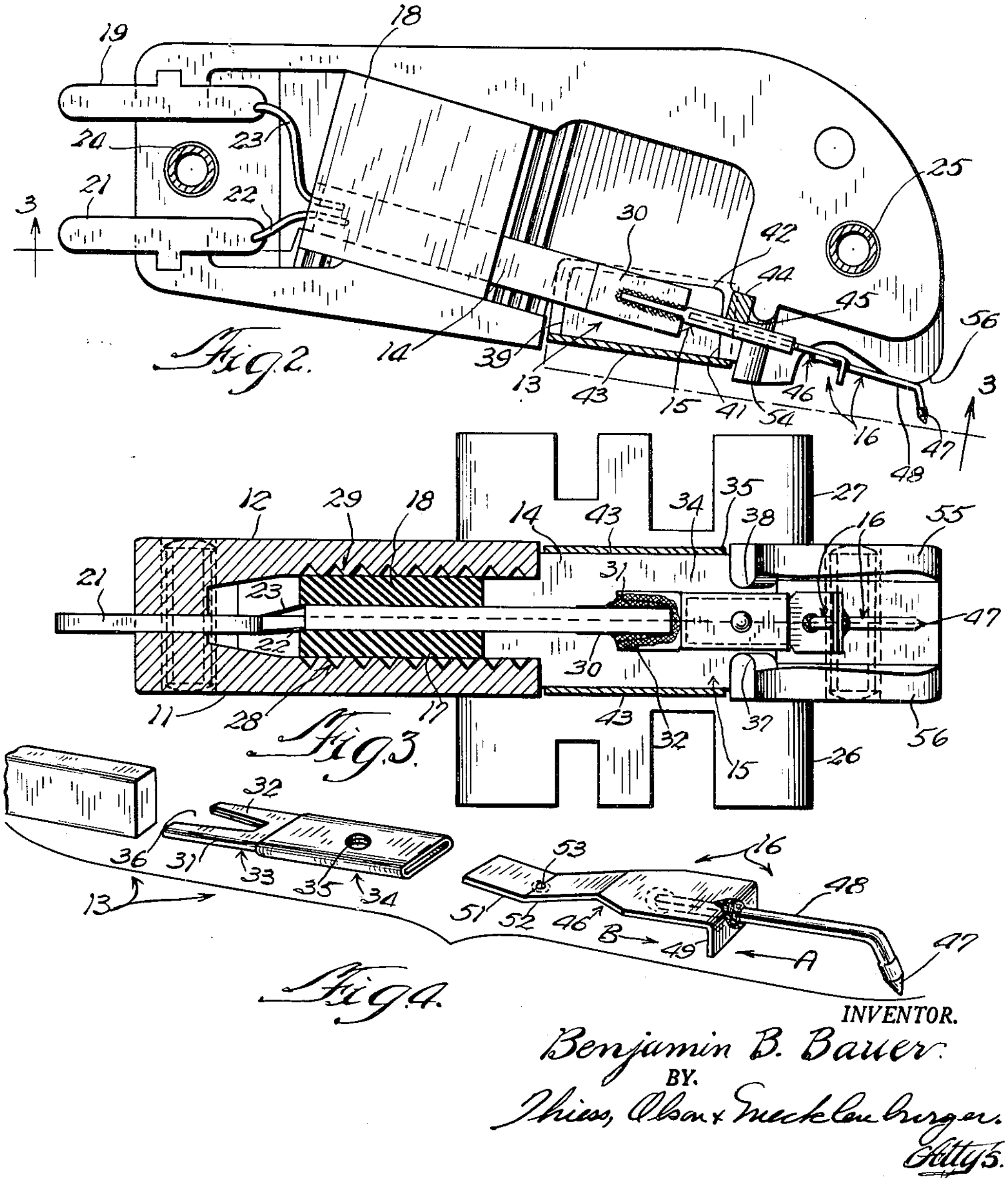
Fig. 2 is an elevational view on a larger scale of the cartridge shown in Fig. 1 with one-half of the casing removed.
Fig. 3 is a sectional view taken substantially along the lines 3—3 of Fig. 2.
Fig. 4 is an exploded view on a larger scale and in perspective of the active components forming the pickup element.

When the needle is assembled to the chuck, as may be seen best in Fig. 2, the needle, the chuck, and the piezoelectric element comprise substantially a single unit which is supported as a cantilever at the rear end of the piezoelectric element and the total weight of the pickup and the associated tone arm is received upon the point 47 of the needle.

A pickup of the character described finds usefulness in record players capable of reproducing only a single record in which the angle of the pickup relative to the record is the same at all times. Or it may be used in a record player capable of reproducing a number of records one at a time, in which case the angle of the pickup relative to the records will vary depending upon the number of records lying upon the turn table. In one position of the pickup, that is, when it is substantially horizontal, the lower edges 53 and 54 may form abutments which will engage the record surface upon a predetermined upward deflection of the needle 16. The amount of upward deflection so permitted may be such that the stylus is unharmed. When the pickup is at a substantial downward angle relative to the record surface, the ends 55 and 56 of the casing halves which lie substantially above and at the side of the point 47 may come into contact with the record surface upon a predetermined upward deflection of the needle 16, thereby protecting the needle and transducer element from injury.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. A pickup element for a phonograph pickup comprising, an elongated piezoelectric element adapted to be supported at one end in said pickup for transverse bending deformation and having its other end free, a needle chuck comprising a flattened tube having at one end a groove horizontally disposed within which the free end of piezoelectric element is received for enabling said chuck to lie in a certain position in said pickup and have an initial stress free relation with said piezoelectric element, said chuck being disposed substantially along the axis of said piezoelectric element and being cemented substantially rigidly thereto at said groove for supporting said chuck without further support by said pickup, and a needle having a flat portion removably received within the flattened other end of the chuck and disposed substantially in line with said chuck and the axis of said piezoelectric element, said needle including a portion comprising substantially only a point offset from the flat portion thereof for engaging record grooves.

2. A pickup element for a phonograph pickup comprising, an elongated piezoelectric element adapted to be supported at one end in said pickup for transverse bending deformation and having its other end free, a needle chuck comprising a flattened tube having at one end a groove horizontally disposed within which the free end of piezoelectric element is received for enabling said chuck to lie in a certain position in said pickup and have an initial stress free relation with said piezoelectric element, said chuck being disposed substantially along the axis of said piezoelectric element and being cemented substantially rigidly thereto at said groove for supporting said chuck without further support by said pickup, the flattened other end of said chuck including a seat therein, and a needle having a flat portion removably received within said flattened other end of said chuck and disposed substantially in line with said chuck and the axis of said piezoelectric element, said flat needle portion including two parts at a slight angle relative to each other with a protuberance at the apex of the angle whereby said protuberance is received in said seat for holding said needle to said chuck, said needle including a portion comprising substantially only a point offset from the flat portion thereof for engaging record grooves.

3. A chuck for holding the flattened portion of a phonograph needle to a piezoelectric element comprising, a tube flattened throughout its length, a slot at one end of said tube for receiving one end of a piezoelectric element, the other end of said tube being flattened only so far as to enable the flattened portion of a phonograph needle to be received therein, and a seat in said other end for receiving an attaching protuberance on said needle flattened portion.

4. A chuck for holding the flattened portion of a phonograph needle to a piezoelectric element comprising, a tube flattened throughout its length, the flattening at one end being such that the portions of the tube lie against each other and the flattening at the other end being such as to leave a flat slot for receiving the flat portion of a phonograph needle to be received therein, a substantially trapezoidal slot at one end of said tube for receiving one end of a piezoelectric element, and a seat in said other end for receiving an attaching protuberance on said needle flat portion.

5. A phonograph stylus comprising, a flattened base member including a flattened resilient portion at one end of said base member and displaced from the general plane thereof, and an elongated stylus member having one end thereof attached to the other end of said base member and extending in line therewith, the other end of said stylus member comprising substantially only a point projecting laterally from said base member.

6. A phonograph stylus comprising, a flattened base member including a flattened resilient portion at one end of said base member and displaced from the general plane thereof, a protuberance formed on said displaced portion, and an elongated stylus member having one end thereof attached to the other end of said base member and extending in line therewith, the other end of said stylus member comprising substantially only a point projecting laterally from said base member.

7. A phonograph stylus comprising, a flattened base member including two flat portions lying at a slight angle to each other at one end of said base member, a protuberance substantially at the juncture of said flat portions, and an elongated stylus member having one end thereof attached to the other end of said base member and extending in line therewith, the other end of said stylus member comprising substantially only a point projecting laterally from said base member.

8. Apparatus for attaching a stylus to a phonograph pickup comprising, a chuck flattened throughout its length adapted to be attached at one end to a transducer, a flattened stylus portion adapted to be attached to a stylus, said flattened portion being receivable in said flattened chuck at its other end, a protuberance located on one of said flattened chuck and flattened portion, and an aperture on the other of said flattened chuck and flattened portion, said aperture and said protuberance being disposed so as to interengage when said flattened portion is received in said flattened chuck.

9. Apparatus for attaching a stylus to a phonograph pickup comprising, a chuck flattened throughout its length adapted to be attached at one end to a transducer, a flattened stylus portion adapted to be attached to a stylus, said flattened portion being receivable in said flattened chuck at its other end, a protuberance located on one of said flattened chuck and flattened portion, and a recess on the other of said flattened chuck and flattened portion, said recess and said protuberance being disposed so as to interengage when said flattened portion is received in said flattened chuck.

10. Apparatus for attaching a stylus to a phonograph pickup comprising, a chuck flattened throughout its length adapted to be attached at one end to a transducer, a flattened stylus portion adapted to be attached to a stylus, said flattened portion being receivable in said flattened chuck at its other end, a protuberance located on said flattened portion, and an aperture on said flattened chuck, said aperture and said protuberance being disposed so as to interengage when said flattened portion is received in said flattened chuck.

References Cited in the file of this patent

UNITED STATES PATENTS

| | | |
|---|---|---|
| 1,904,408 | Charlin | Apr. 18, 1933 |
| 2,174,692 | Dunning | Oct. 3, 1939 |
| 2,363,497 | Begun | Nov. 28, 1944 |
| 2,502,661 | Miller | Apr. 4, 1950 |
| 2,509,356 | Kilgour | May 30, 1950 |
| 2,518,861 | Burtch | Aug. 15, 1950 |
| 2,543,127 | Pickering | Feb. 27, 1950 |
| 2,557,350 | Hutter | June 19, 1950 |
| 2,575,999 | Cordes | Nov. 20, 1951 |
| 2,596,494 | Lynch | May 13, 1952 |
| 2,662,121 | Jensen | Dec. 8, 1953 |

FOREIGN PATENTS

| | | |
|---|---|---|
| 969,232 | France | Dec. 15, 1950 |